US 008652237B2

(12) United States Patent
Heldebrant et al.

(10) Patent No.: US 8,652,237 B2
(45) Date of Patent: Feb. 18, 2014

(54) SYSTEM AND PROCESS FOR CAPTURE OF $H_2S$ FROM GASEOUS PROCESS STREAMS AND PROCESS FOR REGENERATION OF THE CAPTURE AGENT

(75) Inventors: David J. Heldebrant, Richland, WA (US); Phillip K. Koech, Richland, WA (US); James E. Rainbolt, Richland, WA (US); Mark D. Bearden, Richland, WA (US); Feng Zheng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 476 days.

(21) Appl. No.: 12/972,125

(22) Filed: Dec. 17, 2010

(65) Prior Publication Data

US 2012/0152119 A1 Jun. 21, 2012

(51) Int. Cl.
B01D 53/14 (2006.01)
(52) U.S. Cl.
USPC ............ 95/235; 95/181; 95/190; 95/191; 95/193; 95/206; 423/220; 423/226; 423/227; 423/228; 423/229
(58) Field of Classification Search
USPC ............ 95/235, 181, 190, 191, 193, 206; 423/220, 226–229
See application file for complete search history.

(56) References Cited

U.S. PATENT DOCUMENTS 3,767,766 A * 10/1973 Tjoa et al. ............. 423/220
4,137,294 A 1/1979 Braizler et al.
4,238,206 A 12/1980 Hong
4,647,397 A * 3/1987 Starkston et al. ............. 252/189
4,959,086 A * 9/1990 Van Baar et al. ............. 95/235
5,347,003 A * 9/1994 Trauffer et al. ............. 544/8
5,741,949 A * 4/1998 Mack ............. 568/639
7,718,151 B1 5/2010 Hu
2003/0057136 A1 3/2003 McIntush et al.
2012/0063979 A1* 3/2012 Kortunov et al. ............. 423/228

FOREIGN PATENT DOCUMENTS

GB 2079307 A 7/1980
WO 8605474 9/1986

OTHER PUBLICATIONS

Robert N. Maddox, Gilbert J. Mains, and Mahmud A. Rahman, "Reactions of Carbon Dioxide and Hydrogen Sulfide with Some Alkanolamines", 1987, Ind. Eng. Chem. Res., 26, 27-31.*
Maddox et al., Reactions of Carbon Dioxide and Hydrogen Sulfide with some Alkanolamines, 1987, Ind. Eng. Chem. Res., 26, pp. 27-31.*
The Distillation Group, Inc., Distillation, Jan. 11, 2002, The Distillation Group, Inc., Retrieved form internet Aug. 27, 2013, pp. 5-6.*
Heldebrant, D. J., et al., Reversible Zwitterionic Liquids, The Reaction of Alkanol Guanidines, Alkanol Amidines and Diamines with CO2, Green Chem. 1010, 12, 713-721.

(Continued)

Primary Examiner — Robert A Hopkins
Assistant Examiner — Cabrena Holecek
(74) Attorney, Agent, or Firm — James D. Matheson (57) ABSTRACT A system and process are disclosed for selective removal and recovery of $H_2S$ from a gaseous volume, e.g., from natural gas. Anhydrous organic, sorbents chemically capture $H_2S$ gas to form hydrosulfide salts. Regeneration of the capture solvent involves addition of an anti-solvent that releases the captured $H_2S$ gas from the capture sorbent. The capture sorbent and anti-solvent are reactivated for reuse, e.g., by simple distillation.

27 Claims, 5 Drawing Sheets

(56) References Cited

OTHER PUBLICATIONS

Heldebrant, D. J., et al., A reversible zwitterionic SO2-binding organic liquid, Energy Environ. Sci., 2010, 3, 111-113.

Heldebrant, D. J., et al., Organic liquid CO2 capture agents with high gravimetric CO2 capacity, Energy Environ. Sci., 2008, 1, (4), 487-493.

Heldebrant, D. J., Reversible Uptake of COS, CS2 and SO2: Ionic liquids with O-alkylxanthate, O-alkylthiocarbonyl and O-alkysulfite Anions, Chem Eur. J., 2009, 15, (31), 7619-7627.

Jessop, P. G., et al., Green chemistry—Reversible nonpolar-to-polar solvent, Nature, 2005, 436, (76065), 1102-1102.

Phan, L., et al., Switchable solvents consisting of amidine/alcohol or guanidine/alcohol mixtures, Ind. Eng. Chem. Res., 2008, 47, (3), 539-545.

Blasucci, V., et al., One-component, switchable ionic liquids derived from siloxylated amines, Chem. Com., 2009, (1), 116-118.

Blasucci, V., et al., Single component, reversible ionic liquids for energy applications, Fuel, 2010, 89, 1315-1319.

McDaniel, D. H., et al., Hydrogen Sulfide-Hydrosulfide Anion Interactions, Inorg. Chem., 1966, 5, (12), 2180-281.

Maddux, R. N., et al., Reactions of Carbon Dioxide and Hydrogen Sulfide with Some Alkanolamines, Ind. Eng. Chem. Res., 1987, 26, 27-31.

Koga, K., et al., IR Spectra of H2S isolated in free-standing crystals of Kr and Ex, Chem. Phys. Lett. 1998, 293, 180-184.

Halliday, J. D., et al., The reaction of trimethylamine in liquid hydrogen sulphide: an electrical conductivity study, Can. J. Chem., 1983, 61, 1142-1145.

Jou, F. Y., et al., Solubility of Methane in Methyldiethanolamine, J. Chem. Eng. Data, 2006, 51, 1429-1430.

Jessop, P. G., et al., Switchable solvent systems for catalysis and catalyst recovery, Abstracts of Papers of the American Chemical Society 2005, 299, U-971-U971.

International Search Report/Written Opinion from International Application No. PCT/US2011/052602, International Filing Date Sep. 21, 2011, Date of Mailing Jan. 25, 2012.

Maddox, R. N., et al., Reactions of Carbon Dioxide and Hydrogen Sulfide with Some Alkanolamines, Ind. Eng. Chem. Res., 26, 1987, pp. 27-31.

Xu, H-J., et al., Selective H2S Removal by Nonaqueous Methyldiethanolamine Solutions in an Experimental Apparatus, Ind. Eng. Chem. Res, 41, 2002, pp. 2953-2956.

* cited by examiner

| Amine | $H_2$ Uptake (wt%) | Anti-solvent | Anti-solvent to alkanolamine volume ratio | Theoretical maximum mole fraction of anti-solvent | Anti-solvent miscibility with HS-iconic liquid | $H_2S$ Remaining (%) | $H_2S$ Released (%) |
|---|---|---|---|---|---|---|---|
| 25°C | | | | | | | |
| DMEA | 22.9 | N/A | N/A | N/A | N/A | 95.6 | 4.4 |
| DMEA | 19.4 | Hexanes | 1:1 | 0.43 | Miscible | 2.1 | 89.2 |
| DMEA | 19.6 | Dodecanol | 1:1 | 0.31 | Miscible | 10.0 | 48.8 |
| DMEA | 19.2 | Hexadecane | 1:1 | *c | Immiscible | 96.1 | 3.9 |
| DMEA | 20.9 | Eicosane[A] | 1:1 | *c | Immiscible | 95.7 | 4.3 |
| DMEA | 21.8 | Hexanes | 1:10 | 0.07 | Miscible | 76.4 | 23.6 |
| DMEA | 20.0 | Hexanes | 1:2 | 0.28 | Miscible | 56.7 | 43.3 |
| DEEA | 14.1 | Hexanes | 1:1 | 0.50 | Miscible | 0.4 | 97.2 |
| DEEA | 12.5 | Decane | 1:1 | 0.40 | Miscible | 5.0 | 60.0 |
| MDEA | 14.9 | Glyme | 1:1 | 0.52 | Miscible | 11.0 | 25.9 |
| MDEA | 13.7 | Hexanes | 1:1 | *c | Immiscible | 12.0 | 12.8 |
| MDEA | 13.2 | Glyme/Hexanes | 1:1 | *c | Partial | 84.2 | 15.8 |
| MDEA | 11.2 | Benzene | 1:1 | *c | Immiscible | 9.9 | 11.7 |
| 40°C | | | | | | | |
| DMEA | 22.1 | N/A | N/A | N/A | N/A | 35.8 | 64.0 |
| DMEA | 23.8 | Hexadecane | 1:1 | *c | Immiscible | 16.1 | 83.9 |
| DMEA | 20.9 | Eicosane[B] | 1:1 | *c | Immiscible | 29.9[A] | >70.1[A] |

Table 2:
Batch-wise anti-solvent stripping efficiency for alkanolammoniumhydrosulfide salts. Averaged of 2 runs.
[A]Pre-melted at 40°C then injected at 25°C.
[B]Pre-melted and injected at 40°C.
[C]Unable to calculate an accurate mole fraction of anti-solvent due to immiscibility with alkanolamine.

SYSTEM AND PROCESS FOR CAPTURE OF H₂S FROM GASEOUS PROCESS STREAMS AND PROCESS FOR REGENERATION OF THE CAPTURE AGENT

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

FIELD OF THE INVENTION

The present invention relates generally to organic binding liquids for capture of gases from gaseous product streams. More particularly, the invention is a switchable ionic liquid system and process for capture and removal of H₂S from gaseous process streams and process for regeneration of the capture sorbent.

BACKGROUND OF THE INVENTION

A major impurity of natural gas streams is toxic, flammable hydrogen sulfide (H₂S), which must be removed to safely use natural gas. The removal of H₂S, a process known as "gas sweetening", employs physical or chemical sorbents. Gas sweetening with chemical sorbents is typically performed with aqueous solutions of alkanolamines such as monoethanol amine (MEA). However, gas streams purified in this manner must also be dehydrated to remove water so as to prevent formation of hydrates that trap methane. Presence of water can also cause corrosion, and "slug" formation in gas pipelines. Water also limits the effectiveness of the contaminant removal (or gas sweetening) process by increasing an already high thermal energy requirement for stripping H₂S. Furthermore, high temperatures (80° C. to 105° C.) required to heat the aqueous alkanolamine solutions to drive the gas out of solution to regenerate (e.g., thermally swing) the solution require large amounts of energy, which can be responsible for thermally degrading the alkanolamine the aqueous alkanolamine solvent. And, while physical sorbents (e.g., SELEXOL® and RECTISOL®) can be used to sweeten gas without the typical problems associated with water, to work effectively, such sorbents: 1) often suffer from low capture capacities (<10 wt %), 2) typically absorb H₂S under environmental (total) pressures greater than 100 psi, and 3) often perform poorly at gas pressures below about 20 bar. Thus, use of physical sorbents can involve a large capital investment and require large infrastructures to effect removal.

Hydrogen sulfide (H₂S) is an acid gas that does not contain an electrophilic central atom and therefore its reactivity is different than that of other acid gases. As such, H₂S is incompatible with traditional switchable ionic liquids that form alkylcarbonates and alkylsulfites because it doesn't react with alcohols and it reacts directly with strong bases such as amidine and guanidine to form thermally irreversible, solid hydrosulfide salts. Accordingly, new chemically-selective systems and processes are needed for stripping H₂S that do not have the drawbacks of aqueous-based systems, or the high costs associated with conventional physical adsorbents and chemically-selective capture technologies.

SUMMARY OF THE INVENTION

In its simplest form, the invention is a system and method for chemically-selective removal of H₂S from a gaseous volume. The system and method include chemically binding H₂S to a capture sorbent. The capture sorbent includes an anhydrous organic compound with a structural formula as shown:

In the structural formula shown, (n) is a number of carbons greater than 0; (X) is a polar functional group; ($R_1$), and ($R_2$) are alkyl groups defined hereafter. In some embodiments, the polar functional group (X) is selected from: primary (1°) amine groups (—NH₂); secondary (2°) amine groups (—HNR); tertiary (3° amine groups (—RNR'); diamine groups ((—NH₂)₂); primary (1°) alcohol groups (—CH2OH); secondary (2°) alcohol groups (—CHROH); tertiary (3°) alcohol groups (—CRR'OH); alcohol groups (—OH); nitro groups (—NO₂); thiol groups (—SH); sulfonyl-containing groups (—SO₂R); cyano groups (—CN); aldehyde groups (—CHO); amide groups (—NHCOR) (—CONR'R"); ether groups (—OR'); ester groups (—COOR); acetate groups (—COCH₃); tertiary phosphine groups (—PR₃ where R is not 'H'); and including combinations of these polar groups, where (R, R', and R") are alkyl groups or aryl groups. ($R_1$) and ($R_2$) are alkyl groups including, but not limited to, e.g., alkane hydrocarbon groups. In some embodiments, ($R_1$), and ($R_2$) include, but are not limited to, e.g., methyl groups, ethyl groups, propyl groups, alkyl sulfone groups, alkyl nitro groups, and alkyl alcohol groups. In one embodiment, the capture sorbent is an anhydrous tertiary alkanolamine. In some embodiments, the anhydrous tertiary alkanolamine has an H₂S binding capacity of at least about 5 wt %. In other embodiments, the anhydrous tertiary alkanolamine has an H₂S binding capacity of between 10 wt % and 30 wt %. Chemically binding H₂S to the capture sorbent forms a switchable hydrosulfide salt. In various embodiments, the switchable hydrosulfide salt is an ionic liquid selected from: anhydrous alkanolamine ionic liquids, anhydrous alkylcarbonate ionic liquids, anhydrous alkylcarbamate ionic liquids, including combinations of these various ionic liquids. In some embodiments, the hydrosulfide salt is a liquid or a solid hydrosulfide salt. In one embodiment, the hydrosulfide salt is an alkanolammonium hydrosulfide salt. The system and method further include regenerating the capture sorbent. Regeneration of the capture sorbent includes contacting the switchable hydrosulfide salt or the switchable ionic liquid with an anti-solvent that includes at least one non-polar organic compound to release the chemically-bound H₂S from the hydrosulfide salt. In various embodiments, the anti-solvent is selected from non-polar alkane hydrocarbons having a number of carbons greater than 1; non-polar aromatic hydrocarbons; non-polar ethers [R—O—R]; non-polar glymes [(R—O—R)ₙ]; non-polar alcohols (R—OH); non-polar aliphatic alcohols; tetraalkylsilanes [SiR₄]; non-polar waxes, non-polar aprotic solvents, non-polar protic solvents, including combinations of these various anti-solvents. In various embodiments, the anti-solvent can also be a non-polar gas with a molecular weight greater than 16 grams/moL introduced at a pressure greater than 500 psi. In some embodiments, the non-polar gas contains a silane or a hydrocarbon. In one embodiment, the silane is a tetramethylsilane. In one embodiment, the hydrocarbon is a methane. The system and method further include reactivating the capture sorbent by separating the anti-solvent from the capture sorbent after release of H₂S from the hydrosulfide salt or the switchable ionic liquid. In various embodiments, the anti-solvent is separated from the capture sorbent at a temperature below 40° C. with a process including, but not limited to, e.g., decanting, distilling, freezing, melting, heating, boiling, centrifuging, including combinations of these processes. In one embodiment, the anti-solvent is separated from the capture sorbent by distilling either the anti-solvent or the capture sorbent at a temperature below 60° C. In another embodiment, the anti-solvent is separated from the capture sorbent under vacuum.

In its simplest form, a system is provided for reversible capture and recovery of $H_2S$ from a gaseous volume. The system includes: an anhydrous organic capture solvent that chemically binds the $H_2S$ present in the gaseous volume to form a hydrosulfide salt. In one embodiment, the capture solvent is contained in an absorption chamber for capture of $H_2S$ to form an $H_2S$-rich ionic liquid stream. In one embodiment, the anti-solvent is contained in a stripping chamber wherein release of $H_2S$ from the capture sorbent occurs. In another embodiment, the stripping chamber includes a mixer for mixing the anti-solvent with the $H_2S$-rich ionic liquid stream that is introduced to the stripping chamber release of $H_2S$ from the capture sorbent. In another embodiment, the system includes a separation system that separates the anti-solvent from the capture sorbent to recover the regenerated capture solvent and the anti-solvent for re-use that includes a member including, but not limited to: decanting units, freezing units, melting units, distillation units, centrifuge units, condensation units, cooling units, heat exchange units, cross-exchange units, reboiler units, including combinations of these units. In one embodiment, the system is a continuous system for continuous processing of gaseous process streams to remove $H_2S$ from the gaseous process streams. In one embodiment, the separation system includes a decanting unit for phase separating the anti-solvent from the capture sorbent in separate process streams for re-use. In one embodiment, the separation system includes a distillation column for distilling and separating the anti-solvent from the capture sorbent. In one embodiment, the separation system includes a freezing unit that separates the anti-solvent from the capture sorbent.

In another embodiment, a method is provided for capture and release of $H_2S$. The method includes: capturing $H_2S$ with a capture sorbent to form an anhydrous switchable ionic liquid; regenerating the capture sorbent by contacting the switchable ionic liquid with an anti-solvent comprising a non-polar organic compound; and reactivating the capture sorbent by removing the anti-solvent from the capture sorbent. In one embodiment, the step of reactivating the capture solvent includes distilling the anti-solvent when the anti-solvent is more volatile than the switchable anhydrous capture sorbent. In another embodiment, the step of reactivating the capture sorbent includes distilling the switchable anhydrous capture solvent when the capture sorbent is more volatile than the anti-solvent. In another embodiment, the step of reactivating the capture sorbent includes freezing the anti-solvent by cooling to a temperature below the freezing point of the anti-solvent and separating same from the capture sorbent. In another embodiment, the step of reactivating the capture sorbent includes phase-separating the anti-solvent from the anhydrous capture sorbent into at least two layers and decanting the layer containing anti-solvent or decanting the layer containing the anhydrous capture sorbent to separate the two layers.

DETAILED DESCRIPTION

In one embodiment, a uniquely switchable hydrosulfide ionic liquid system is described that can replace conventional aqueous alkanolamine technologies known in the art for capture of acid gases including $H_2S$ from gaseous process streams. The various embodiments include processes for regeneration of the capture sorbent. The following description includes a preferred best mode of one embodiment of the present invention. It will be clear from this description that the embodiments of the invention are not limited to the illustrated embodiments but that the invention also includes a variety of modifications and embodiments thereto. Therefore, the present description should be seen as illustrative and not limiting. While the embodiments of the invention are susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

$H_2S$-Binding Organic Liquids

A new class of switchable $H_2S$-Binding Organic Liquids (or $H_2SBOLs$) is described herein that provides selective chemical binding of $H_2S$ at standard temperature and pressure (i.e., STP or ambient conditions) or at elevated pressure (i.e., above ambient pressure). The term "switchable" means the capture sorbent can reversibly transition from a non-ionic liquid state to an ionic liquid state (i.e., that contains a liquid hydrosulfide salt) by chemically capturing an acid gas (e.g., $H_2S$ gas). The term "elevated pressure" means the pressure of the mixed gas stream or volume from which $H_2S$ contaminant gas is captured and removed is above the ambient environmental pressure. The term "liquid salt" means the salt formed in the ionic liquid melts at a temperature below STP. In various embodiments, $H_2SBOLs$ that chemically capture $H_2S$ to form liquid hydrosulfide salts are chemical compounds having the following general structural formula:

Here, ($R_1$) and ($R_2$) are alkyl groups including, but not limited to, e.g., methyl groups; ethyl groups; propyl groups, alkylsulfone groups, alkyl nitro groups, and alkyl alcohol groups; (n) is a number of carbons greater than 0; and (X) is a polar functional group. Examples of polar functional groups include, but are not limited to: primary (1°) amine groups (—$NH_2$); secondary (2°) amine groups (—HNR); tertiary (3°) amine groups (—RNR'); diamine groups ((—$NH_2)_2$); primary (1°) alcohol groups (—CH2OH); secondary (2°) alcohol groups (—CHROH); tertiary (3°) alcohol groups (—CRR'OH); alcohol groups (—OH); nitro groups (—$NO_2$); thiol groups (—SH); sulfonyl-containing groups (—$SO_2R$); cyano groups (—CN); aldehyde groups (—CHO); amide groups (—NHCOR) (—CONR'R''); ether groups (—OR'); ester groups (—COOR); acetate groups (—$COCH_3$); tertiary phosphine groups (—$PR_3$ where R is not 'H'); including combinations of these polar groups, where (R, R', and R'') are alkyl groups as defined above, or aryl groups. Compounds having this general structural formula can act as $H_2$SBOLs. In a preferred embodiment of the invention detailed further herein, an Anti-Solvent Swing Regeneration (ASSR) process is described that serves to regenerate the anhydrous capture sorbent. The anti-solvent that regenerates the sorbent is at least partially miscible with the $H_2$SBOL and cracks the ionic liquid. While the preferred embodiment is described hereafter using exemplary anhydrous tertiary alkanolamine bases as $H_2$SBOLs, the invention is not intended to be limited thereto.

Figure 1:
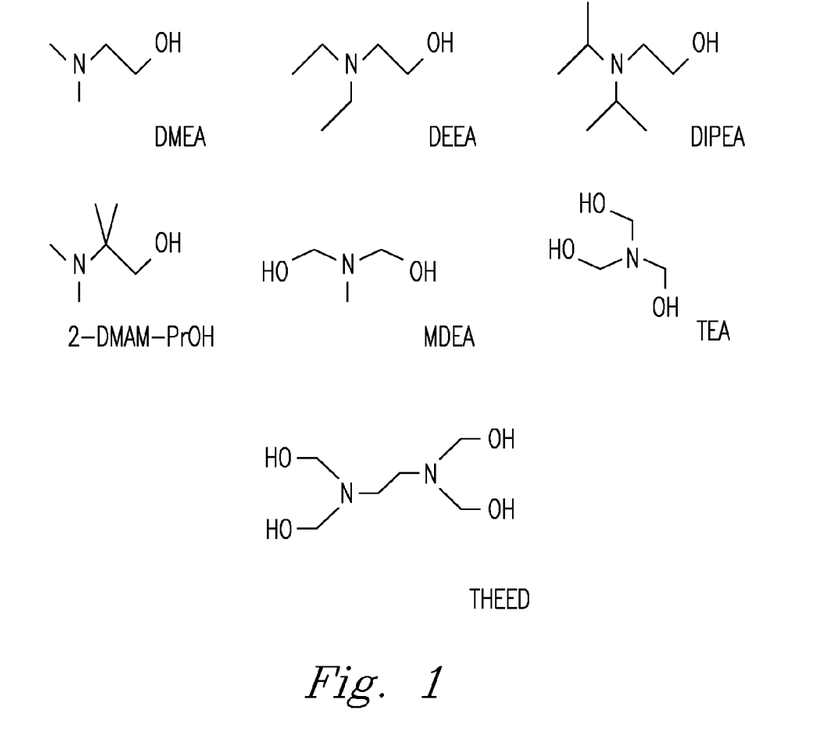
FIG. 1 shows exemplary tertiary anhydrous alkanolamines suitable for reversible capture of $H_2S$ in accordance with an embodiment of the invention.

FIG. 1 shows exemplary tertiary alkanolamines suitable for use as the anhydrous capture sorbent in conjunction with the invention. The term "anhydrous" as used herein means a quantity of $H_2O$ of less than about 1 percent by weight (1 wt %) in the capture sorbent. To minimize presence of water in the anhydrous capture sorbent, water is preferably removed from the gas stream (e.g., by dehumidification) before $H_2S$ is removed by the anhydrous capture sorbent, but the process is not limited thereto. For example, in some embodiments, water is removed following regeneration of the capture sorbent or after a preselected number of regeneration cycles. Thus, no limitations are intended. A majority of alkanolamines available commercially are colorless liquids. However, tertiary alkanolamines that are solid at room temperature can also be used by melting the solids, as described further herein. Thus, both liquid and solid tertiary alkanolamines can be used. Examples of (simple) tertiary alkanolamines ($H_2$SBOLs) include, but are not limited to, e.g., dimethylethanolamine (DMEA), diethylethanolamine (DEEA), and diisopropylethanolamine (DIPEA). The term "simple" means the tertiary alkanolamine contains a single alcohol (or nitrogen) moiety per amine in the molecule and whose conjugate acid has a "pKa" value close to $H_2S$. Examples of more complex tertiary alkanolamines include, but are not limited to, e.g., methyldiethanolamine (MDEA) triethanolamine (TEA) and N,N,N',N'-Tetrakis(2-hydroxyethyl)ethylenediamine (THEED). The term "complex" means the tertiary alkanolamine contains more than one alcohol (or nitrogen) moiety per amine in the molecule.

In a preferred embodiment of the ASSR process detailed hereafter, an anti-solvent composed of at least one preselected non-polar organic compound is added to the hydrosulfide salt formed in the anhydrous alkanolamine capture sorbent to release the chemically-bound $H_2S$, thereby regenerating the capture sorbent. The term "regeneration" as used herein refers to the act of stripping (releasing) $H_2S$ from the capture sorbent to restore the sorbent's capacity to again bind $H_2S$. The term "anti-solvent" as used herein means a non-polar organic compound that has at least partial miscibility in the capture sorbent that effects release of the chemically-bound acid gas (e.g., $H_2S$) from the capture sorbent. The term "reactivation" as used herein means reclaiming the anti-solvent and the capture sorbent following regeneration (i.e., release of chemically-bound $H_2S$) by separating both the anti-solvent and the capture sorbent for reuse, as described further herein.

In another embodiment detailed further herein, an anti-solvent comprising a heavy (i.e., a carbon number greater than 10) non-polar organic liquid that is a solid at STP melted to form a liquid that is then added to the $H_2$S-rich capture sorbent to release chemically bound $H_2S$ from the capture sorbent. The addition of the anti-solvent "regenerates" the capture sorbent, but also "deactivates" the capture sorbent. "Deactivation" means the sorbent is unable to provide uptake of $H_2S$. "Reactivation" refers to the act of removing anti-solvent from the capture sorbent, which renders the capture sorbent active for capture of $H_2S$. Reactivation thus allows the capture sorbent to be recycled and reused. Anti-solvent can be recovered, e.g., by distilling volatile anti-solvents or capture sorbents, phase separating anti-solvents or capture sorbents, decanting heavy hydrocarbon anti-solvents, freezing the anti-solvents or capture sorbents, separating the anti-solvents or capture sorbents, including combinations of these methods.

Reaction Between $H_2S$ and Anhydrous Alkanolamines

Figure 2:
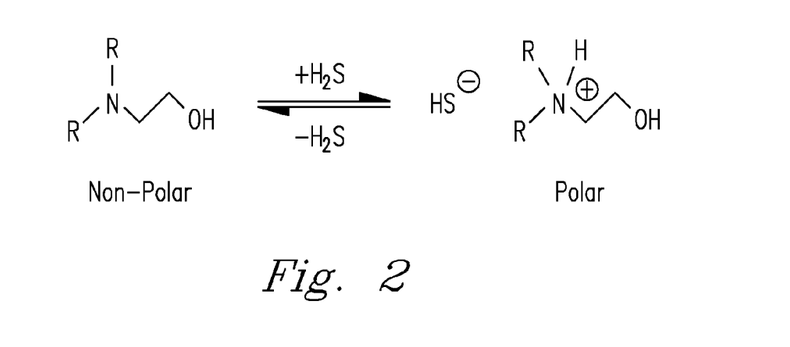
FIG. 2 illustrates the chemical equilibrium reaction between an anhydrous alkanolamine and $H_2S$ that forms a liquid hydrosulfide salt in accordance with an embodiment of the invention.

FIG. 2 illustrates the reversible chemical reaction that occurs between $H_2S$ and anhydrous alkanolamines that forms a hydrosulfide salt. Alkanolamines having boiling points greater than 100° C. are preferred, as low vapor pressures minimize evaporative losses when large flow-through volumes of $H_2S$ are filtered, but choices for alkanolamines are not intended to be limited thereto. For example, solids and gels may also be used, as described herein.

Uptake of $H_2S$ by Anhydrous Alkanolamines

Anhydrous tertiary alkanolamines gravimetrically show significant uptake of $H_2S$ at STP. In various tests (as detailed in EXAMPLE 1 hereafter), selected alkanolamines were bubbled with $H_2S$ at 1 atm and 25° C. for 1.25 h to ensure $H_2S$ saturation. TABLE 1 lists $H_2S$ capture capacities (gravimetric data) for exemplary tertiary alkanolamines. Reichardt's dye was used as a solvato-chromatic indicator in which wavelength of maximum absorbance ($\lambda_{max}$) is related to sorbent polarity.

TABLE 1

$H_2S$ capture capacities (gravimetric) of various anhydrous alkanolamines.

| Compound | Physical State | Avg.* wt % | Avg.* mol % | Reichardt's Dye Polarity (nm) |
|---|---|---|---|---|
| DMEA | Liquid | 21.0 | 32.6 | 580 |
| DEEA | Liquid | 13.2 | 30.9 | 605 |
| DIPEA | Liquid | 1.7 | 6.3 | 624 |
| DBUA | Liquid | 0 | 0 | ** ns |
| MDEA | Liquid | 14.7 | 34.0 | 551 |
| THEED | Gel | 6.4 | 28.0 | 545 |
| TEA | Solid | 5.8 | 18.7 | 532 |

*Average of 5 cycles on and off.
** ns = Not Soluble

As shown in TABLE 1, $H_2$SBOLs of the invention are chemically selective, with capacities for $H_2S$ of up to about 21 wt %. Chemical absorption of $H_2S$ (mol %) follows the trend of decreasing sorbent polarity. The equilibrium condition that exists between the non-polar alkanolamine and the polar hydrosulfide salt in the capture sorbent is illustrated (see FIG. 2). Gravimetric uptake of $H_2S$ is highest for more polar alkanolamines, and lower for less polar alkanolamines. DMEA, with the smallest N-substituents, is the most polar of the selected alkanolamines and absorbs the most $H_2S$, followed by DEEA, and then DIPEA whose bulkier aliphatic N-substituents decrease the polarity of the sorbent. All simple alkanolamines remained as liquids before and after exposure to $H_2S$. Uptake of $H_2S$ then proceeds in the order of: DMEA, THEED, and TEA. After 60 minutes of sparging at one atmosphere, DMEA absorbed 32.6 mol % (15.6 wt %) $H_2S$, DEEA absorbed 30.9 mol % (11.5 wt %), DIPEA absorbed 6.3 mol % (1.7 wt %), while dibutylundecanolamine (DBUA) was unable to absorb any $H_2S$ due to insolubility in the sorbent. Of the more complex tertiary alkanolamines (see FIG. 1), methyldiethanolamine (MDEA) absorbed $H_2S$ at 34 mol % (14.7 wt %), N,N,N',N'-Tetrakis(2-hydroxyethyl)ethylenediamine (THEED) absorbed $H_2S$ at 28 mol % (6.4 wt %), and triethanolamine (TEA) absorbed $H_2S$ at 18.7 mol % (5.8 wt %). MDEA remained a liquid after exposure to $H_2S$ at ambient (STP) conditions. THEED became gel-like and TEA solidified. The observed phase change of THEED and TEA after exposure to $H_2S$ is indication of the chemical reaction to form the insoluble hydrosulfide salts. Low $H_2S$ uptake for THEED and TEA is attributed to the high viscosity and insoluble salt formation upon exposure to $H_2S$, which prevents mixing and thus limited diffusion of $H_2S$. All alkanolamines except DBUA also show an increase in temperature upon contact with $H_2S$, indicating a high heat of dissolution or an exothermic chemical reaction. That the hydrosulfide salt (i.e., HS— alkanolammonium salt) can remain as a liquid at STP is attributed to incomplete uptake of $H_2S$. Once a liquid alkanolamine sorbent becomes a solid (or a gel) after uptake of $H_2S$, the solid hydrosulfide salt can be precipitated, or be dissolved in an inert solvent for easier processing. Thus, no limitations are intended. As a general rule, the greater the polarity of the capture sorbent, the better the chemical uptake of $H_2S$ gas. The greater the polarity of the sorbent, however, the more difficult the ASSR regeneration described hereafter. $H_2$SBOLs are preferably selected that maximize capture and uptake of $H_2S$ but work well with the ASSR regeneration.

Conductance Measurements

Conductivity measurements were performed in a 160 mL stainless steel pressure vessel (Parr) that was stirred (250 rpm). The vessel was modified to include a 10-10,000 µS conductivity probe (Omega CDCE-90-1) equipped with a 0-200 psi pressure transducer (Omega PX01CO-200 A5T). Neat alkanolamines were loaded and sealed into the vessel. $H_2S$ was then sparged into the pressure cell directly from gas bottles through 1/16" lines composed of PolyEtherEther Ketone (PEEK). Uptake of $H_2S$ in DMEA is illustrative. Conductance measurements of anhydrous DMEA solutions showed an increase in conductance from 0 µS to 2,580 µS following addition of $H_2S$, which is attributed to the chemical formation of DMEA-ammonium hydrosulfide salt and the ionization of $H_2S$ into the $HS^-$ anion (see FIG. 2). The increase in conductivity of the sorbent demonstrates that uptake of $H_2S$ involves a chemical reaction (i.e., chemical binding) between the $H_2S$ and the anhydrous alkanolamines, not physical dissolution of $H_2S$ in the capture sorbent, or the formation of neutral Lewis acid/base adducts between the $H_2S$ and the alkanolamines as there is no ionic species to conduct charge. Further, conductance of the solution decreases to 4 µS after thermal stripping, confirming degradation of the ionic species. Nuclear Magnetic Resonance (NMR) spectroscopy, Infra-red (IR) spectroscopy, and conductance measurements were used to confirm formation and degradation of the various binding salts, detailed hereafter.

Spectroscopic Changes

Trialkanolammonium hydrosulfide liquids were characterized by $^1H$ NMR using a Varian (300 MHz) spectrometer; $^{13}C$ NMR using a Varian 300 (75.5 MHz) spectrometer, and infrared spectroscopy (IR) using a Nicolet Magna-750 spectrometer running OMNIC software performed in a sealed air-free IR cell fitted with KBR disks. NMR analyses were performed on neat hydrosulfide salts to prevent decomposition of the ionic liquid. DMEA was selected as a representative alkanolamine for the spectral characterization described hereafter. Minor spectral changes are observed in the $^1H$ NMR and $^{13}C$ NMR spectra for the alkanolamine when $H_2S$ is present. The $^1H$ NMR spectrum of DMEA [with methyl ($CH_3$) hydrogens referenced at 1 ppm] shows a new peak that appears upfield from the OH signal at 3.7 ppm concurrent with the disappearance of the OH signal at 4.1 ppm. The terminal $CH_2$—O hydrogens also shift up-field from 2.4 ppm to 2.3 ppm, attributed to the change from non-ionic to ionic character of the sorbent. The liquid hydrosulfide salts also show a highly characteristic (very weak) H—S band at 2565 $cm^{-1}$ in proximity to solid $H_2S$ and other reported H—S containing molecules such as thiols in Xe crystals at 2630-2580 $cm^{-1}$. The H—S bands are very weak and sharp, and highly characteristic of the chemical binding between $H_2S$ and the alkanolamine system described herein because no other functional groups appear in this range (2630-2580 $cm^{-1}$). Upon $H_2S$ stripping, the $^1H$ NMR matches that of the neat DMEA and the IR band for H—S disappears indicating the complete removal of $H_2S$.

Release of $H_2S$ Gas

Anti-Solvent Swing Regeneration (ASSR)

In a preferred embodiment of the "Anti-Solvent Swing Regeneration" (ASSR) process, rapid and nearly complete release of $H_{2S}$ that is chemically bound in the alkanolammonium hydrosulfide ($HS^-$) salt (e.g., at 25° C.) in the capture sorbent can be effected by addition of a non-polar organic "anti-solvent" that is sufficiently miscible with the anhydrous alkanolamine capture sorbent. Miscibility measures the degree to which the non-polar organic "anti-solvent" mixes with, forms a uniform blend with, or otherwise dissolves in, the capture sorbent when added. The term "sufficiently miscible" means the anti-solvent mixes with, or dissolves in, the $H_2S$-rich capture sorbent to a degree sufficient to release chemically-bound $H_2S$ from the hydrosulfide salt formed upon uptake of $H_2S$ in the capture sorbent. In the instant embodiment, ASSR involves a transfer of an acidic proton from an ammonium alkanolamine salt (i.e., the ionic liquid) back to the hydrosulfide anion ($HS^-$) salt, forming $H_2S$. Chemically bound $H_2S$ is then released thereby regenerating the alkanolamine capture sorbent. ASSR employs the degradation of the hydrosulfide ($HS^-$) salt to form $H_2S$. The insolubility of $H_2S$ in the non-polar sorbent then serves to drive $H_2S$ out of the $H_2S$-rich sorbent, rapidly releasing the pure gas at a high rate and at a near-ambient temperature. When the anti-solvent is partially miscible (e.g., when heavy hydrocarbon anti-solvents are used), a stripping efficiency for release of $H_2S$ from the capture sorbent of up to about 84% is obtained. And, $H_2S$ is released even though a separation layer may be observed between the anti-solvent phase and the capture sorbent phase upon mixing. When the anti-solvent is fully miscible (e.g., when pentane and hexane anti-solvents are used), a stripping efficiency for release of $H_2S$ from the capture sorbent of up to about 97% is obtained. Results further show that ASSR is rapid. Release of $H_2S$ is complete after about 15 minutes with minor agitation (e.g., with a stir bar). Although complete, experiments conducted herein were allowed to run about 1 hour to about 1.5 hours to ensure the reaction equilibrium had been reached, but the invention is not limited thereto. Mole fractions and wt % values reported herein denote a result obtained from batch-wise processing. However, the invention is not intended to be limited to batch-wise processes. For example, for flow-processing, quantity of anti-solvent can be controlled based on flow rates and mixing rates in the capture sorbent. Thus, no limitations are intended to batch-wise processing conditions only.

Anti-Solvents

Anti-solvents suitable for use in conjunction with the invention are non-polar organic solvents that have sufficient miscibility (i.e., totally miscible or at least partially miscible) with the neat alkanolamine sorbents [but not with the hydrosulfide salt (HS)] including, but not limited to, e.g., non-polar alkane hydrocarbons (e.g., pentanes, hexanes, decanes); non-polar aromatic hydrocarbons (e.g., benzene, toluene); non-polar ethers [R—O—R]; non-polar glymes [(R—O—R)$_n$]; non-polar alcohols (R—OH); non-polar aliphatic alcohols (e.g., dodecanols, hexadecanol); tetraalkylsilanes [SiR$_4$]; non-polar distillable solvents; non-polar heavy hydrocarbons having a carbon number greater than 10 that are at least partially miscible in the selected capture sorbent; non-polar waxes, non-polar aprotic solvents, non-polar protic solvents, low-boiling hydrocarbon gases (e.g., methane) introduced at pressures greater than 500 psi, including blends of these various anti-solvents. Anti-solvents that are at least partially miscible with the selected anhydrous alkanolamines are expected to be suitable for cracking hydrosulfide salts present in the capture sorbent, thereby regenerating the capture sorbent.

Figure 3:
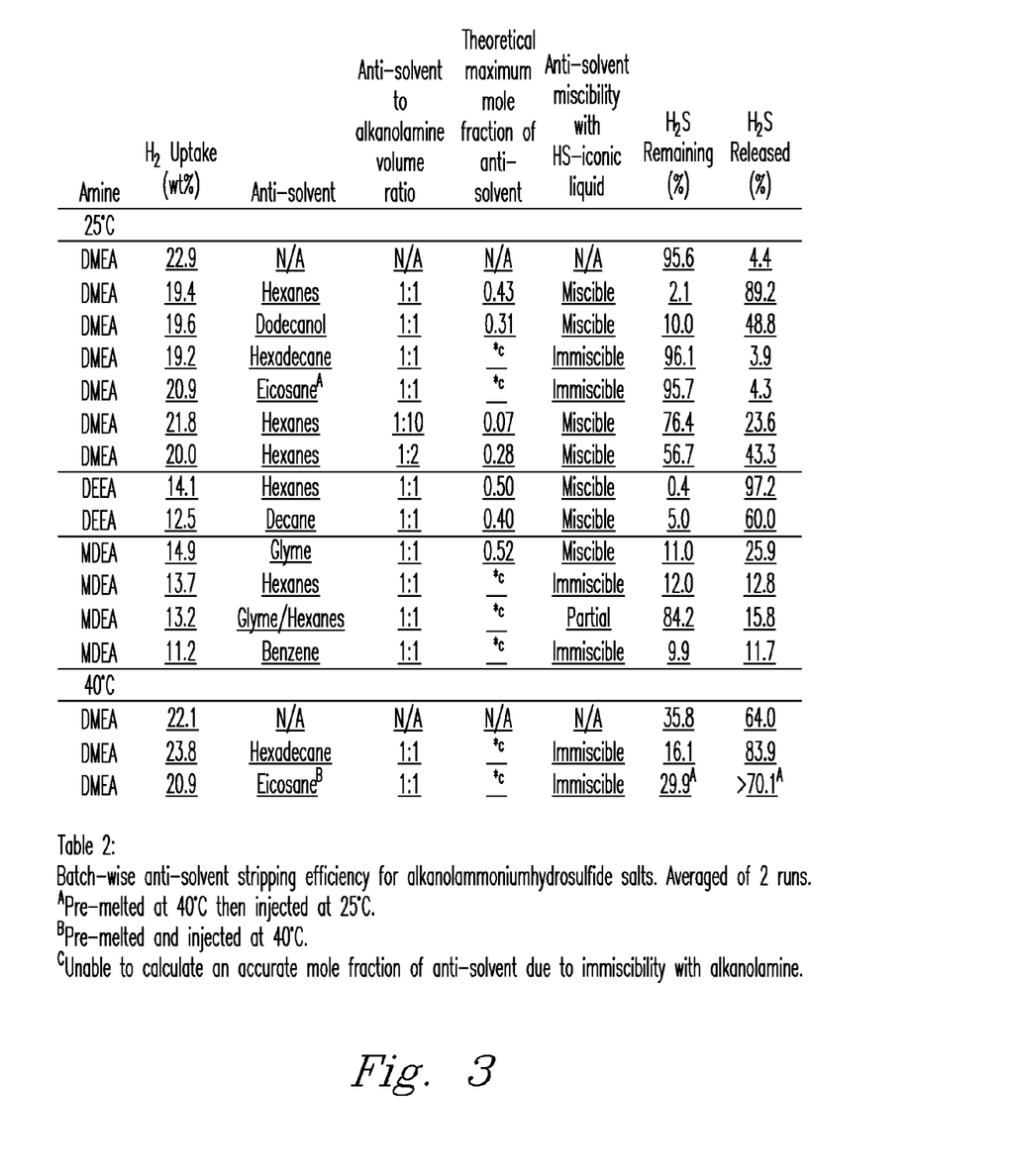
FIG. 3 presents stripping efficiency data for various anti-solvents for release of $H_2S$ when added to selected anhydrous alkanolamine capture sorbent in accordance with an embodiment of the invention.

FIG. 3 is a table (TABLE 2) showing ASSR stripping efficiency data for uptake and release of $H_2S$ gas from exemplary alkanolamine capture sorbents at 25° C. using exemplary anti-solvents. As shown in the table, release of $H_2S$ from alkanolamonium hydrosulfide salts is achieved by injecting a non-polar organic anti-solvent and agitating. ASSR stripping efficiency is linked to the solubility of the anti-solvent in the alkanolamine. As shown, hexanes are effective in removing up to 97% of $H_2S$ from [DEEAH]$^+$SH$^-$, and 89% from [DEEAH]$^+$SH$^-$ due to its miscibility with DMEA and DEEA. Decanes are less effective than hexanes, removing 60% $H_2S$ from [DEEAH]$^+$SH$^-$. Decanes are less effective because they have a lower solubility in DEEA than hexanes. Hexanes are less effective at cracking [MDEAH]$^+$SH$^-$ (12.8%) because MDEA is more polar than DEEA and hexanes are less soluble in MDEA than DEEA. Pentane is a most rapid and effective anti-solvent for rupturing [DMEAH]$^+$SH$^-$. However, the evolution of $H_2S$ is rapid. And, due to the high volatility of pentane, an accurate mass balance was not measured. Due to the rapid evolution and toxic nature of $H_2S$, extreme caution should be used and adequate safety measures (e.g., caustic bubblers) employed when pentane is injected into hydrosulfide salts. As described herein, any non-polar organic liquid (aprotic or protic) or blend of non-polar organic liquids can act as an anti-solvent to crack the hydrosulfide salt containing the chemically bound $H_2S$ provided the anti-solvent is sufficiently (i.e., partially or totally) miscible with the neat alkanolamine sorbent. Non-polar aprotic anti-solvents such as benzene, toluene and glyme (slightly more polar than linear alkanes) are less effective at breaking the hydrosulfide salts likely due to their limited solubility in neat alkanolamines. Long hydrophobic alcohols such as dodecanol are also able to remove up to 48.8% $H_2S$ from [DMEAH]$^+$SH$^-$. Mixtures (1:1 by volume) of non-polar solvents such as hexanes and glyme were also found to remove 16.2% $H_2S$, which is slightly less than pure glyme but more than pure hexane anti-solvents, indicating that the anti-solvent does not need to be pure to remove $H_2S$. Heavy hydrocarbon anti-solvents such as hexadecane and eicosane were also found to release $H_2S$ from [DMEAH]$^+$SH$^-$ ionic liquids with varying degrees of success. Hexadecane released only 10% $H_2S$ at 25° C., while eicosane as a solid released only 4.3% $H_2S$ at 25° C. Stripping ability increases for both heavy hydrocarbons as temperature increases. For example, at 40° C., both eicosane and hexadecane were more effective, releasing 70.1% and 83.9% $H_2S$ at 40° C., respectively. A control was run where [DMEAH]$^+$SH$^-$ was heated to 40° C. while connected to a caustic bubbler. After 15 minutes of agitation at 40° C., bubbling ceased, and the mass of the sample was measured to determine the quantity of $H_2S$ released. 64.0% of the $H_2S$ was removed in the control experiment by thermal heating alone, indicating incomplete stripping. A control experiment with DMEA was also performed at 25° C. without anti-solvent, which showed 4.4% of $H_2S$ was removed simply by stirring. Control experiments in which an anti-solvent was used showed an enhancement in total $H_2S$ removal and a reduction in time required to strip $H_2S$. Both hexadecane and eicosane were found to be miscible with neat DMEA before contact with $H_2S$. However, heavy hydrocarbons were found to be immiscible with DMEA after uptake and removal of $H_2S$. After $H_2S$ stripping, hexadecane and eicosane formed distinct separate clear and colorless liquid layers atop the (slightly yellow) $H_2S$-lean DMEA. Even incomplete stripping of $H_2S$ leaves a sufficient quantity of polar [DMEAH]$^+$SH$^-$ ionic liquid to phase separate out the heavy hydrocarbons. Phase separation allows the anti-solvent to separate from the lean amine sorbent with no distilling or cooling of the anti-solvent required. Furthermore, hexadecane and eicosane are non-toxic, have a negligible vapor pressure (even at 40° C.), and are chemically inert, making them the most attractive anti-solvents for industrial applications. In batch-wise testing, degree of $H_2S$ release by ASSR was found to be dependent on both the mole fraction of anti-solvent employed and the solubility of the anti-solvent in the neat alkanolamine (see TABLE 1). [DMEA]$^+$SH$^-$ ionic liquids were contacted with three different volumes ratios of hexanes to the ionic liquid, 1:10, 1:2 or 1:1. The 10% loading of hexanes had a mole fraction of 0.07, and was found to release 23.6° A) $H_2S$ from the liquid over 1.5 hours. A 50% hexanes loading had a mole fraction of 0.28, and released 43.3% $H_2S$ from the liquid over 1 hour. The 100% loading hexanes had a mole fraction of 0.43 and was able to remove 89.2% $H_2S$ over 1.5 hours time. Results indicate that for in-batch processing conducted at 25° C., anti-solvent mole fractions greater than about 0.40 are needed to decrease the polarity of the sorbent sufficiently to obtain near complete ASSR. Continuous flow systems can be expected to employ anti-solvent mole fractions of less than about 0.40 if the anti-solvent and alkanolamines are continually re-circulated. Breakdown of the hydrosulfide salt is attributed to the bulk polarity of the sorbent. Hydrosulfide ionic liquids are highly polar media, which are in equilibrium with the less polar alkanolamines (see FIG. 2). Dissolution of the non-polar anti-solvent into the non-hydrosulfonated alkanolamine decreases the bulk sorbent polarity, thus destabilizing the hydrosulfide salt, which breaks the hydrosulfide salt and continually forces the reaction equilibrium to the left. Because $H_2S$ is insoluble in non-polar liquids and begins to phase separate, $H_2S$ has a high vapor pressure and is released into the headspace. If a sufficient quantity of anti-solvent is used to decrease the polarity of the alkanolamine, quantitative stripping of $H_2S$ is theoretically possible at temperatures near ambient.

Advantages of ASSR

ASSR performed in accordance with embodiments of the invention is unique. A primary benefit of Anti-Solvent Swing Regeneration (ASSR) is the ability to rapidly release chemically bound $H_2S$ from the hydrosulfide salt at ambient (STP or 25° C.) temperatures by addition of one or more non-polar, inert, and low-boiling organic solvents. The ease of release of the captured gas at ambient (STP) temperatures provides cost savings benefits compared with traditional aqueous solvent systems that require elevated temperatures to thermally strip and recover $H_2S$. ASSR of the invention can also be employed to release $H_2S$ under elevated pressure conditions. Low-temperature (e.g., STP) recovery of $H_2S$ gas from the capture sorbent and low-temperature regeneration of the sorbents involved also minimizes thermal degradation of the capture (sorbent) liquid, maximizing sorbent lifetimes. "Sorbent lifetime" or "sorbent make-up rate" refers to the time before additional sorbent must be added to a system. By regenerating the sorbent at STP, a lower sorbent vapor pressure exists that also is associated with lower sorbent loss and lower sorbent degradation. So, there is also a lower sorbent make-up rate required, which favorably affects the economics for $H_2S$ capture. This attribute alone provides a substantial competitive advantage compared with conventional capture systems that require elevated temperatures for thermal stripping. In particular, elevated temperatures can lead to substantial sorbent loss and thermal degradation of the sorbents used. Conventional aqueous alkanolamine systems are not capable of employing anti-solvent swing regeneration because the anti-solvents are not miscible in water and cannot change (i.e., decrease) the polarity of the polar medium required to force $H_2S$ from the medium. Even if the anti-solvent is miscible in the polar medium, if the anti-solvent is unable to shift the polarity of the liquid hydrosulfide salt, the anti-solvent will not provide the necessary swing regeneration capability. For example, in a conventional non-switchable ionic liquid, addition of an anti-solvent does not crack and release chemically-bound $H_2S$ from the ionic liquid because hydrosulfide ($HS^-$) is stabilized in its ionized form by the ionic liquid.

ASSR works for any switchable ionic liquid system or functionalized ionic liquid system provided the anti-solvent is at least partially miscible in, and can switch the polarity of, the switchable ionic liquid. Thus, ASSR technology can be adapted for use with any switchable ionic liquid system to provide efficient gas stripping. Other switchable ionic liquid systems that can be used with ASSR include, but are not limited to, e.g., switchable alkyl carbonate systems, switchable carbamate systems, switchable $CO_2$ Binding Organic Liquids ($CO_2BOLs$) systems, and switchable ionic liquid systems that do not involve aqueous, or solid sorbents. ASSR thus allows for addition of an anti-solvent to these switchable ionic liquid systems to enhance the efficiency, or rate of, release of chemically bound (i.e., captured) gases including, e.g., $H_2S$, $CO_2$, $SO_2$, as well as mixtures of these gases, which decreases costs associated with the regeneration of the switchable ionic liquid. In some cases, addition of the anti-solvent can break the ionic liquid (i.e., the non-ionic form of the switchable ionic liquid) to release the non-polar gas, and the non-polar gas will remain miscible in the anti-solvent. In such cases, while the anti-solvent breaks the ionic liquid to release the non-polar gas, the non-polar gas may not separate from the solution. In such cases, an increase in temperature can be used to remove the non-polar gas from the anti-solvent to regenerate the capture sorbent. Thus, the invention is not intended to be limited.

In a typical case, addition of the selected anti-solvent shifts the polarity of the switchable ionic liquid such that the non-polar gas is chemically released from the ionic liquid and moves to the anti-solvent. A low thermal swing temperature then recovers the anti-solvent and releases the capture gases regenerating the capture sorbent. "Thermal swing" and "thermal swing temperature" as the terms are used herein to describe ASSR refer to the temperature for separating the anti-solvent from the (e.g., anhydrous alkanolamine) capture sorbent, not the temperature used to drive $H_2S$ from the aqueous alkanolamine capture liquid as taught in the conventional art. In particular, since the swing temperature used in conjunction with ASSR is needed only to remove the gas from the sorbent—not to break the chemically-bound gas from the spent sorbent—temperature to release gas from a given ionic liquid can be reduced by up to 30 degrees, substantially decreasing the cost of regeneration of the capture sorbent.

ASSR also minimizes thermal degradation of the alkanolamine capture sorbent due to comparatively low thermal swing temperatures associated with ASSR relative temperatures employed in the conventional art. ASSR is thus more efficient than conventional approaches. In particular, it is more efficient (cost-wise and energy-wise) to heat (or cool) an anti-solvent of the invention than it is to heat an aqueous alkanolamine solution due to the comparatively low boiling points, freezing points, and low specific heats of the anti-solvent relative to aqueous based systems that require large heats to drive $H_2S$ from the aqueous liquid. In addition, the anhydrous alkanolamine capture sorbent is reactivated simply by removing or separating the anti-solvent from the capture sorbent. Separation is effected using, e.g., thermal swing regeneration (described immediately hereinabove), decantation, freezing, including combinations of these various processes. Thus, no limitations are intended.

ASSR further employs cheap and commercially available organic chemicals. In addition, since ASSR does not employ water, problems associated with use of water such as hydrates, slugs, and corrosion do not occur. And, the organic chemicals used as the anti-solvents in conjunction with ASSR are easily regenerated by simple recovery of the anti-solvent described above, which means ASSR avoids costly distillation associated with aqueous alkanolamine-based chemical absorbers.

Solvent regeneration by ASSR is also low energy, meaning that, compared with conventional technologies, lower energy is expended. In particular, because ASSR regeneration of the invention is directed at removing the anti-solvent, not the cracking of the ionic liquid as done with, e.g., aqueous alkanolamine systems, temperature used to remove the organic anti-solvent is lower. So, lower energy is expended. For example, boiling of water requires a temperature from about 80° C. to about 105° C. In contrast, removal and separation of organic anti-solvents from the capture sorbent occur at much lower temperatures. For example, volatile organic anti-solvents can be distilled at low temperatures. As an example, pentane used as an anti-solvent can be distilled by boiling at 36° C. And, heavy hydrocarbons (i.e., greater than 10 carbons) can be separated by freezing the hydrocarbons at a low temperature (e.g., 25° C.). Room-temperature decanting can also be used to remove an anti-solvent. Because organic anti-solvents have a low specific heat compared to water, all of these separation processes are more energy efficient than boiling water, because less energy is expended to separate the anti-solvents from the capture sorbent. In one exemplary embodiment, regeneration of the non-polar anti-solvent proceeds by low-temperature distillation from the alkanolamine capture sorbent, with subsequent condensation of the non-polar anti-solvent. ASSR thus does not require prolonged boiling of the sorbent at elevated temperatures to thermally regenerate the sorbent unlike traditional aqueous-based alkanolamine systems and processes known in the conventional art. For example, non-polar anti-solvents generally boil at a temperature in the range from about 35° C. to about 73° C. Pentane (i.e., n-pentane) is illustrative. When pentane, which boils at 36° C. (97° F.), is used as the anti-solvent in the ASSR process, a maximum thermal swing temperature of 11° C. (i.e., from about 25° C. to about 36° C.) is required to reactivate the anhydrous alkanolamine sorbent. For a conventional aqueous alkanolamine solution, a thermal swing temperature of from 55° C. to 80° C. is required to thermally strip the aqueous capture solvent (i.e., from about 25° C. to about 80° C. or from about 25° C. to 105° C.).

So, ASSR can offer a large energy savings relative to conventional thermal stripping approaches. Anti-solvents are inoperative in conventional aqueous-based alkanolamine systems known in the art because anti-solvents are not miscible in the water solvent and cannot therefore break hydrosulfide salts formed in the polar aqueous-containing medium. Further, because the hydrosulfide salts are soluble in the polar liquid, $H_2S$ cannot be reversibly released (i.e., broken out) from the solvent medium.

The present invention finds direct application in the scrubbing of $H_2S$ gas as a contaminant gas from, e.g., natural gas streams released at elevated pressures from natural gas sources and gasified coal streams in pressurized coal gasification processes. For example, the invention provides a low molecular weight hybrid $H_2S$ scrubber that chemically captures $H_2S$ in the absence of water and has the unique ability to release the captured gas using a cost-effective (inexpensive) Anti-Solvent Swing Regeneration (ASSR) process for recovery of the captured $H_2S$ gas and regeneration of the capture sorbent, as detailed herein in various embodiments. This system presents an attractive gas capture and release system.

ASSR and Repeated Cycling of Anhydrous Alkanolamines

In one embodiment of the invention, ASSR involves decantation of the hydrocarbon anti-solvent to separate the anti-solvent from the anhydrous alkanolamine sorbent, which allows for recovery and recycling of the anhydrous alkanolamine sorbent. In one exemplary test, five cycles of repeated chemical absorption of $H_2S$ by DMEA were performed, followed by ASSR with hexadecane. TABLE 3 summarizes results from the recycling of DMEA with hexadecane.

TABLE 3

Recycling of DMEA using ASSR via decantation of hexadecane[a]

| Cycle | $H_2S$ uptake (Wt %) | $H_2S$ released (%) |
|---|---|---|
| 1 | 21.8 | 82.1 |
| 2[b] | 14.8 | 97.7 |
| 3[b] | 15.2 | 88.1 |
| 4[b] | 13.1 | 95.5 |
| 5[b] | 13.9 | 96.1 |

[a]DMEA and hexadecane (1:1) ratio were used and stripping was performed at 40° C.
[b]Low $H_2S$ uptake values are due to a residual quantity (~17%) of $H_2S$ left in the starting lean amine. Also the high $H_2S$ release is based only on the uptake per run.

Results in TABLE 3 show DMEA chemically absorbed 21.8 wt % $H_2S$ upon bubbling for 1.5 hours. ASSR was conducted by adding $H_2S$-rich DMEA to an equal volume of hexadecane and immersing the resulting two-phase mixture into a preheated water bath (40° C.) and rapidly stirring. 82.1% of $H_2S$ was released, leaving a residual quantity of $H_2S$ (17.9%) remaining in the capture sorbent. Evolution of $H_2S$ ceased after about 15 minutes. Incomplete stripping of $H_2S$ from the sorbent means that a quantity of polar hydrosulfide salt remains in the sorbent, which polarity forces hexadecane out of the alkanolamine (i.e., DMEA) phase. The top hexadecane phase was removed via syringe and saved for the next cycle. The $H_2S$ lean DMEA was bubbled with $H_2S$ for 1.5 hours resulting in 14.8 wt % $H_2S$ uptake, this low uptake compared with the first cycle is attributed to the fact that the $H_2S$-lean DMEA still contains about 5.0 wt % of $H_2S$ from the previous cycle. This $H_2S$-rich DMEA stripped by ASSR using recovered hexadecane from the first cycle. Results showed that 97.7% of the $H_2S$ absorbed by the $H_2S$-lean DMEA (not including the $H_2S$ still contained in the $H_2S$-lean DMEA) in cycle 2 could be released. These experiments were repeated for three more cycles and results demonstrate that the $H_2S$-lean DMEA can be recycled without loss of activity under the hexadecane ASSR conditions. ASSR results show that $H_2S$ can be chemically captured and the anhydrous alkanolamine sorbent can be regenerated with a low-energy penalty, meaning there is energy efficient, low-temperature separation of the anti-solvent from the anhydrous alkanolamine sorbent.

In another embodiment of ASSR, at least one non-polar hydrocarbon that is a solid at STP (i.e., a so-called "heavy" hydrocarbon, with a melting point greater than about 25° C. but sufficiently close to ambient temperature) is melted and added to the alkanolamine sorbent containing the chemically bound $H_2S$ (i.e., as a liquid HS— salt). Addition of the liquid, albeit melted, hydrocarbon releases the $H_2S$ gas from the anhydrous alkanolamine capture sorbent, regenerating the capture sorbent. Recovery of the anti-solvent proceeds by cooling or freezing the regenerated capture sorbent that solidifies and precipitates the anti-solvent, reactivating the capture sorbent.

Other Processes for Regenerating the Capture Sorbent

Release of $H_2S$ from the hydrosulfide salt formed between the selected alkanolamine and the chemically-bound $H_2S$ to regenerate the capture sorbent can also be achieved by sparging with an inert gas (e.g., $N_2$, $CO_2$), by low-temperature thermal swing regeneration, freezing and decanting heavy hydrocarbon anti-solvents, reduced pressure/vacuum conditions, other like processes, including combinations of these various processes. No limitations are intended.

Effect of Gaseous Hydrocarbons on $H_2S$ Release

Non-polar gases may also act as anti-solvents at pressures greater than 500 psi, where the mole fraction of the gas in the alkanolamine substantially increases. Gases suitable for use as anti-solvents include, but are not limited to, e.g., silanes (e.g., tetramethylsilane) and gaseous hydrocarbons (e.g., methane). Methane and other gaseous hydrocarbons are anti-solvents, but they cannot perform ASSR of hydrosulfide salts at low pressures <500 psi because they have poor solubility in anhydrous alkanolamines, and likely exhibit even less solubility in polar hydrosulfide ionic liquids. A natural gas (i.e., $CH_4$) stream was modeled at various inlet pressures below 500 psi as a test case. Partial pressure of $CH_4$ was 300 psi to 500 psi depending on the natural gas composition. At these pressures, gas partial pressure was found to be too low to effectively dissolve $CH_4$ gas into the anhydrous alkanolamines. Further, the mole fraction of $CH_4$ in anhydrous MDEA at 25° C. at 250 psi or 472 psi is 0.01 and 0.02 respectively (see *J. Chem. Eng. Data*, 2006, 51, pp. 1429-1430). Thus the theoretical maximum amount of $CH_4$ dissolved in pure DMEA and acting as an anti-solvent at 25° C. and <500 psi is so small that it cannot effectively perform ASSR like liquid hydrocarbons. In particular, at these pressures, mole fraction of anti-solvent is too low to effect desired release of $H_2S$ from the capture sorbent. In comparison, the mole fraction of a 1:1 volume ratio of hexanes anti-solvent to MDEA is 0.43. This means an order of magnitude more anti-solvent is theoretically available in a dissolved liquid than from dissolved methane ($CH_4$). Thus, minimal ASSR can be expected from any gaseous hydrocarbon at pressures below 500 psi.

Reactivation of Alkanolamines Following ASSR

Reactivation of anhydrous alkanolamines for repeated $H_2S$ uptake can be performed by separating the anti-solvent from the anhydrous alkanolamines. The capture sorbent (alkanolamine) and the anti-solvent are easily regenerated for reuse, e.g., using simple distillation at near ambient pressures and temperatures. Separation and subsequent recovery of the anti-solvents from the anhydrous alkanolamines can be achieved, e.g., by distillation of volatile anti-solvents (e.g. pentane, hexanes, tetraalkylsilanes), and freezing and decantation of high-boiling anti-solvents (e.g. hexadecane, eicosane). Reactivation of the anhydrous alkanolamines by any of these means is advantageous from the perspectives of cost, ease, and protection of the alkanolamines and the anti-solvents. Once the anti-solvent is removed, recovered, and recycled, the alkanolamine is then again ready for capture of $H_2S$ in a repeat cycle.

The ASSR stripping method for removing $H_2S$ from chemically-selective capture sorbents mitigates the limitations of conventional regeneration techniques (e.g., thermal heating) employed currently in industry. Thermal regeneration of $H_2S$-saturated sorbents requires energy-intensive boiling of water-based alkanolamine solutions at high temperatures (compounded by water's high specific heat), resulting in evaporative losses of the alkanolamines. Further, thermal heating results in degradation of the alkanolamines. In contrast, distillation of low-boiling anti-solvents, precipitating or phase-separating anti-solvents from the alkanolamines can require less energy to regenerate the anhydrous alkanolamines than boiling aqueous alkanolamine solutions. For example, linear alkanes like pentane and hexanes have low specific heats, and boil at 36° C. and 50-70° C. (depending on the isomer) respectively, far lower than the 80-105° C. needed to reactivate alkanolamines (for future $H_2S$ uptake) in water. Heavy hydrocarbons (greater than 10 carbons) such as hexacedane and eicosane (melting point-15-40° C.) can be used as anti-solvents at temperatures above their melting point. Heavy hydrocarbons as anti-solvents can naturally phase separate out from the $H_2S$-lean alkanolamines. Natural-phase separation of heavy hydrocarbon anti-solvents (from $H_2S$-lean alkanolamine solutions) by decantation can be a most efficient alkanolamine reactivation process because it requires no thermal heating of either the amine or anti-solvent. Reactivation of the amines for future $H_2S$ uptake by removing the anti-solvent by means of any of these three processes is likely to mitigate evaporative losses and thermal degradation of the anhydrous alkanolamines and require less energy than boiling of water-based capture solutions.

ASSR Gas Sweetening System for $H_2S$ Stripping

Figure 4:
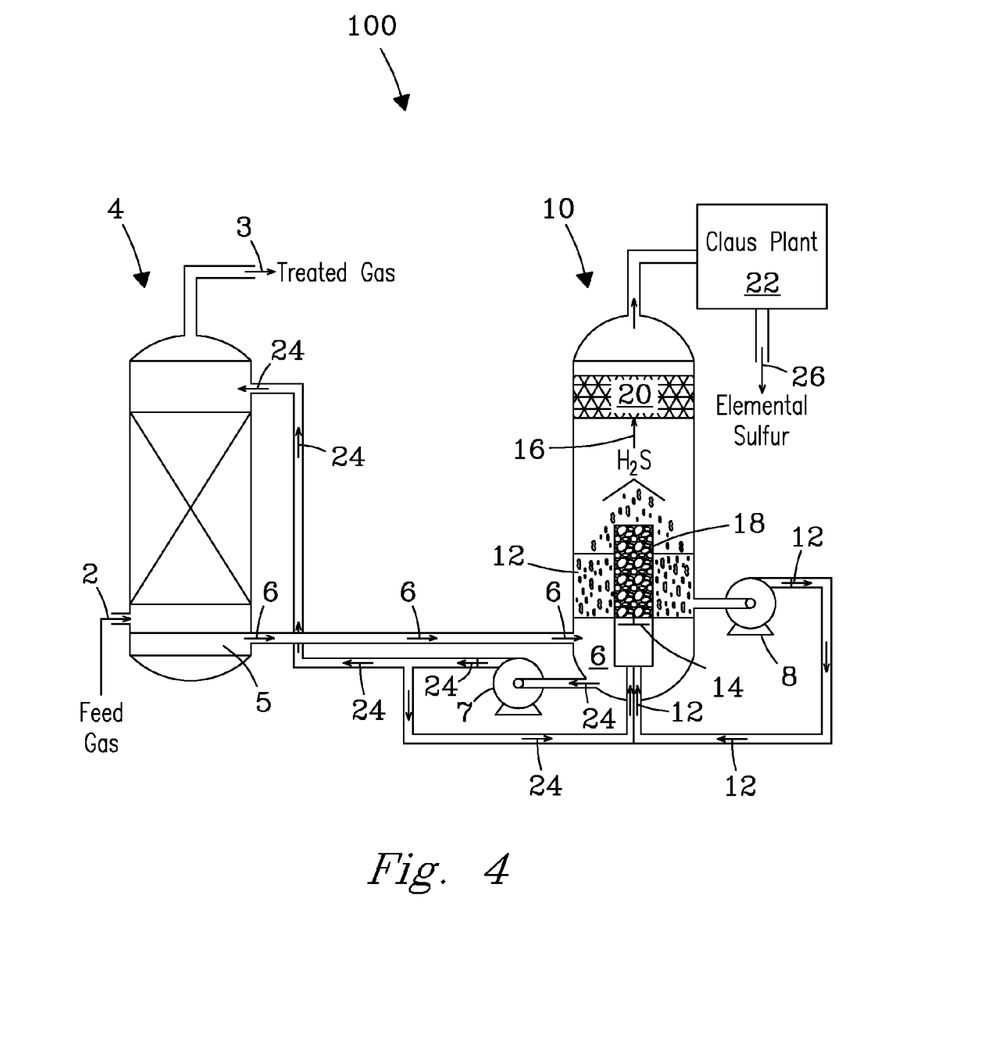
FIG. 4 illustrates an exemplary industrial ASSR system for regeneration of an anhydrous alkanolamine capture sorbent in accordance with an embodiment of the invention.

FIG. 4 shows an ASSR gas sweetening system 100 of an exemplary design for removal and recovery of $H_2S$ gas from gaseous volumes (e.g., natural gas streams) and regeneration of the capture sorbent, according to an embodiment of the invention. In the figure, a chemical absorption column 4 containing an $H_2$SBOL sorbent 5 (e.g., anhydrous alkanolamine sorbent), provides for uptake of $H_2S$ gas from a feed gas 2 introduced to absorption column 4. After $H_2S$ uptake, the $H_2S$-rich anhydrous alkanolamine 6 is introduced to stripping chamber 10 that contains an anti-solvent 12, e.g., a heavy hydrocarbon. $H_2S$-rich alkanolamine 6 and anti-solvent 12 are then mixed with, e.g., a static mixer 14 or other mixing means. Blending of $H_2S$-rich alkanolamine 6 and anti-solvent 12 forces evolution of $H_2S$ 16 from the sorbent liquid in stripping chamber 10. Evolved $H_2S$ 16 passes into, e.g., a degassing zone 18 in stripping chamber 10 that is fitted with a mist eliminator 20 to remove any volatiles. Pure $H_2S$ 16 is subsequently delivered to, e.g., a Claus unit 22 for neutralization. Clean anti-solvent 12 removed from chamber 10 is decanted and recirculated continually from the $H_2S$-lean alkanolamine 24 via pump 8 and recycled back into stripping chamber 10. Lean alkanolamine 24 (i.e., without entrained $H_2S$) is reactivated, e.g., by cooling (e.g., STP or 25° C.) to remove any entrained anti-solvent 12 and circulated via pump 7 and introduced back into (e.g., at the top of) absorption column (absorber) 4 for a new $H_2S$ uptake capture cycle.

Figure 5:
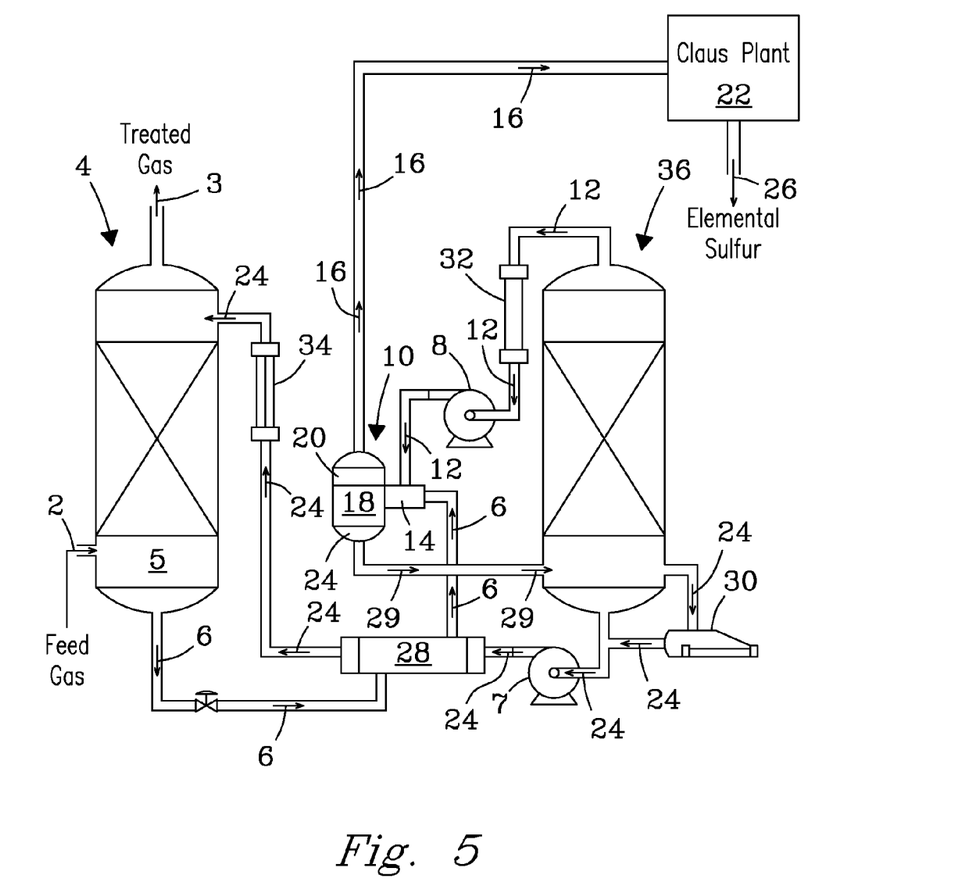
FIG. 5 illustrates an exemplary industrial ASSR system for regeneration of an anhydrous alkanolamine capture sorbent in accordance with another embodiment of the invention.

FIG. 5 shows an ASSR gas sweetening system 100 for removal and recovery of $H_2S$ gas from gaseous volumes (e.g., natural gas streams) and regeneration of the capture sorbent, according to another embodiment of the invention. In the figure, a chemical absorption column 4 containing an $H_2$SBOL sorbent 5 (e.g., anhydrous alkanolamine sorbent) provides for uptake of $H_2S$ gas present in a feed gas 2 (e.g., natural gas) when introduced to absorption column 4. Following uptake of $H_2S$ (e.g., in absorption column 4), $H_2S$-rich sorbent 6 warm from the exothermic reaction with $H_2S$ is transferred to cross exchanger 28 where heat is transferred into the $H_2S$-lean sorbent 24 returning via pump 7 from distillation column 36. Column 36 separates anti-solvent 12 from regenerated ($H_2S$-lean) sorbent 24 received in a stream 29 from stripping column 10. Separating anti-solvent 12 as a hydrocarbon gas from regenerated ($H_2S$-lean) sorbent 24 in distillation column 36 is endothermic, so sorbent 24 may be returned cool to cross exchanger 28, where heat transferred from absorber 4 can be exchanged to equalize temperature. $H_2S$-lean sorbent 24 can also be optionally heated to selected temperatures in conjunction with a reboiler unit 30 that is coupled to distillation column 36 prior to the heat exchange in cross exchanger unit 28. Anti-solvent 12 separated from sorbent 24 in distillation column 36 is subsequently condensed in condenser 32 and delivered via pump 8 to mixer unit 14, where anti-solvent 12 is added into stripping chamber 10 after being mixed with $H_2S$-rich sorbent 6 from another stream. Blending of $H_2S$-rich sorbent 6 and anti-solvent 12 forces evolution of H₂S 16 from the sorbent 6 in stripping chamber 10. Evolved H₂S 16 passes, e.g., into degassing zone 18 in stripping chamber 10 that is fitted with a mist eliminator 20 that removes any volatiles. Pure H₂S 16 is subsequently delivered to, e.g., a Claus unit 22 for neutralization. Lean sorbent 24 (i.e., without entrained H₂S) passed through cross-exchanger 28 is reactivated, e.g., by cooling (e.g., to STP) in cooler 34 and delivered via pump 7 back into (e.g., at the top of) absorption column (absorber) 4 for a new H₂S uptake/capture cycle.

Figure 6:
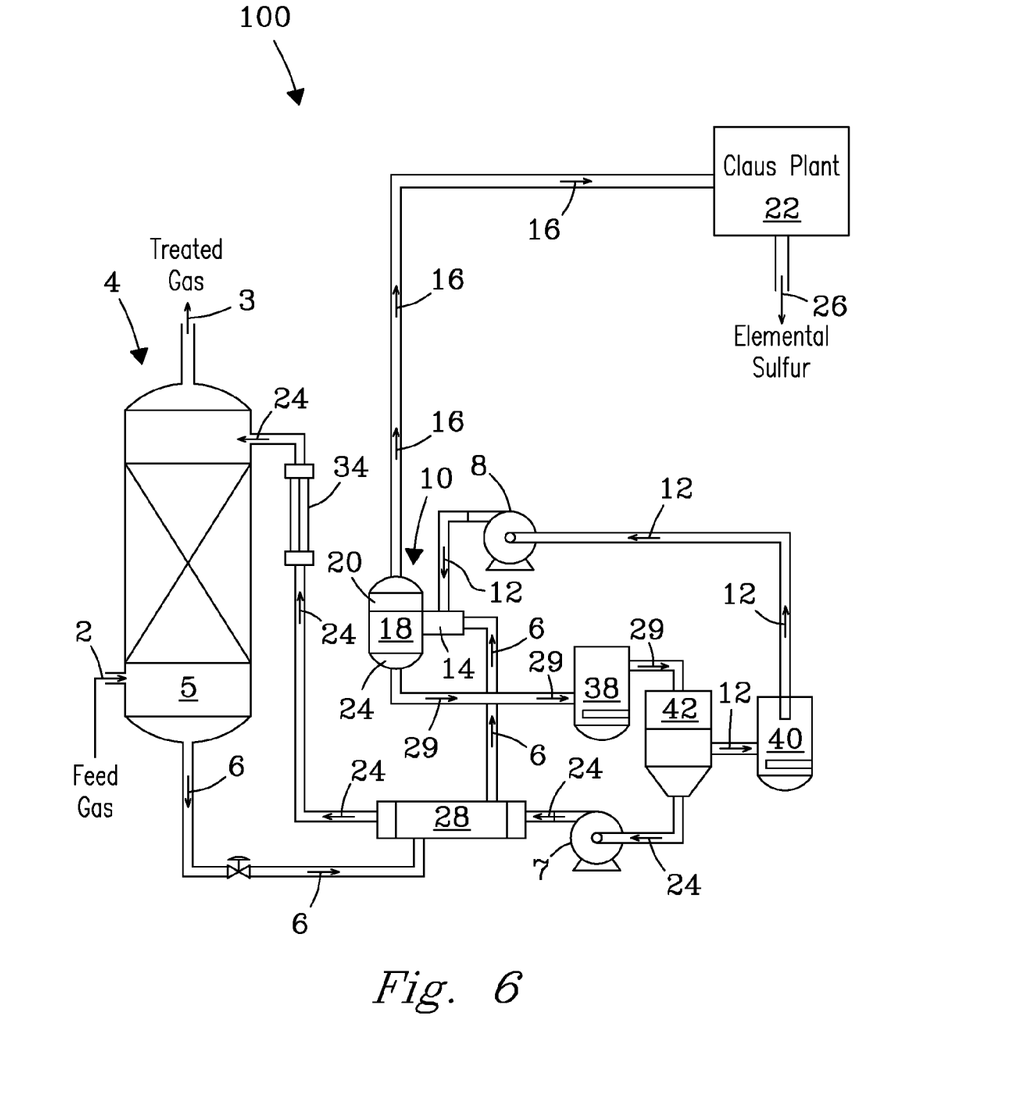
FIG. 6 illustrates an exemplary industrial ASSR system for regeneration of an anhydrous alkanolamine capture sorbent in accordance with another embodiment of the invention.

FIG. 6 shows yet another embodiment of an ASSR gas sweetening system 100 for removal and recovery of H₂S gas from gaseous volumes (e.g., natural gas streams) and regeneration of the capture sorbent. In the figure, a chemical absorption column 4 containing an H₂SBOL sorbent 5 (e.g., anhydrous alkanolamine sorbent) provides for uptake of H₂S gas present in a feed gas 2 (e.g., natural gas) when introduced to absorption column 4. Following uptake of H₂S (e.g., in absorption column 4), H₂S-rich sorbent 6 warm from the exothermic reaction with H₂S is transferred to cross (heat) exchanger 28 where heat is transferred into H₂S-lean sorbent 24 returning via pump 7 from centrifuge unit 42 warming the stream. A mixed stream 29 containing regenerated (H₂S-lean) sorbent 24 and anti-solvent 12 mixed together is introduced to a freezing unit 38. Freezing unit 38 freezes (solidifies) the anti-solvent 12 hydrocarbon in stream 29 and delivers the mixed solidified stream 29 to centrifuge unit 42, where separation of the (solidified) anti-solvent 12 and (cooled) regenerated sorbent 24 occurs. Anti-solvent 12 is melted in melting tank 40 (and optionally heated to a selected temperature), and delivered via pump 8 to mixer unit 14, where it is re-introduced back into stripping chamber 10 after being mixed with another stream (i.e., as a new cycle) of H₂S-rich sorbent 6. Blending of H₂S-rich sorbent 6 and anti-solvent 12 forces evolution of H₂S 16 from the sorbent 6 in stripping chamber 10. Evolved H₂S 16 passes into, e.g., a degassing zone 18 in stripping chamber 10 that is fitted with a mist eliminator 20 to remove any volatiles. Pure H₂S 16 is subsequently delivered to, e.g., a Claus unit 22 for neutralization. Lean sorbent 24 (i.e., without entrained H₂S) separated in centrifuge 42 is passed through cross-exchanger 28 where heat may be exchanged to equalize temperature. Lean sorbent 24 is reactivated, e.g., by cooling (e.g., to STP) in cooler 34, where the sorbent 24 is delivered via pump 7 back into (e.g., at the top of) absorption column (absorber) 4 for a new H₂S uptake/capture cycle.

The following examples provide a further understanding of the invention in one or more aspects.

Example 1

Representative Procedure for H₂S Uptake

DEEA (1.43 g) was charged into a test tube containing a stir bar and a septum and sealed, massed, and connected to an H₂S cylinder in a ventilated fume equipped with four H₂S sensors (BW Technologies) having a 1 ppm sensitivity. Three caustic bubblers were used in tandem with a bleach bubbler to neutralize any excess H₂S. The DEEA was sparged with H₂S for 1.25 hours forming the alkanolammonium hydrosulfide salt, which was then massed. Percentage of H₂S uptake (12.4 wt %) was determined based on H₂S absorbed (0.178 g) and the amount of DEEA used. Procedure was repeated for all alkanolamines tested.

Example 2

H₂S Recovery and Sorbent Regeneration

Chemically-bound H₂S was released (i.e., broken) from the alkanolammonium hydrosulfide salt formed in EXAMPLE 1 by sparging the hydrosulfide salt in the H₂S-rich capture sorbent with nitrogen for 30 minutes and passing released gas through caustic bubblers. Anti-solvent regeneration (ASSR) was performed by adding an equal volume of a non-polar solvent. The biphasic mixture was stirred rapidly. Rapid release of H₂S was observed for DMEA and DEEA and stripping of >90% of H₂S was achieved at 25° C.

Example 3

Recycling/ASSR with Hexadecane Decantation

DMEA (2 mL) was sparged with H₂S for 1.5 hours at 25° C., then massed for H₂S uptake. Hexadecane (2 mL) as anti-solvent was injected via syringe over [DMEAH]⁺SH⁻ and the sample was then massed. The two-phase mixture was immersed into a preheated water bath (40° C.) and vigorously stirred to release H₂S. After H₂S release, the biphasic mixture was again massed to determine the degree of H₂S release. The hexadecane phase was separated from H₂S-lean DMEA via syringe and H₂S-lean DMEA was again massed and reused.

While preferred embodiments of the present invention have been shown and described, it will be apparent to those of ordinary skill in the art that many changes and modifications may be made without departing from the invention in its true scope and broader aspects. The appended claims are therefore intended to cover all such changes and modifications as fall within the spirit and scope of the invention.

What is claimed is:
1. A method for chemically-selective removal of H₂S from a gaseous volume, the method comprising:
chemically binding H₂S to a capture sorbent comprising an anhydrous organic compound with a structural formula as follows:

where R₁ and R₂ are alkyl-containing groups; (n) is a number of carbons greater than 0; and (X) is a polar functional group, the binding forming a switchable hydrosulfide salt in the capture sorbent; and
regenerating the capture sorbent by adding a selected quantity of an anti-solvent comprising a non-polar organic compound miscible in the capture sorbent that changes the polarity of the capture sorbent releasing the chemically-bound H₂S from the switchable hydrosulfide salt.
2. The method of claim 1, wherein the polar functional group (X) is selected from the group consisting of: primary amine groups; secondary amine groups; tertiary amine groups; nitro groups; thiol groups; alcohol groups; primary alcohol groups; secondary alcohol groups; tertiary alcohol groups; cyano groups; aldehyde groups; amide groups; ether groups; ester groups; tertiary phosphine groups; sulfone groups; sulfonyl-containing groups; acetate groups; diamine groups, and combinations thereof.

3. The method of claim 1, wherein $R_1$ and $R_2$ are alkyl-containing groups selected from: methyl groups, ethyl groups, propyl groups, alkyl sulfone groups, and alkyl nitro groups.

4. The method of claim 1, wherein the switchable hydrosulfide salt is a liquid hydrosulfide salt or a solid hydrosulfide salt.

5. The method of claim 1, wherein the switchable hydrosulfide salt is a switchable alkanolammonium hydrosulfide salt.

6. The method of claim 1, wherein the anhydrous organic compound is an anhydrous tertiary alkanolamine.

7. The method of claim 6, wherein the anhydrous tertiary alkanolamine has a $H_2S$ binding capacity of at least about 5 wt %.

8. The method of claim 6, wherein the anhydrous tertiary alkanolamine has a $H_2S$ binding capacity from about 10 wt % to about 30 wt %.

9. The method of claim 1, wherein the switchable hydrosulfide salt is an ionic liquid selected from the group consisting of: anhydrous alkanolamine ionic liquids, anhydrous alkylcarbonate ionic liquids, anhydrous alkylcarbamate ionic liquids, and combinations thereof.

10. The method of claim 1, wherein the anti-solvent is selected from the group consisting of: non-polar alkane hydrocarbons with a carbon number greater than 1; non-polar aromatic hydrocarbons; non-polar ethers [R—O—R]; non-polar glymes [(R—O—R)$_n$]; non-polar alcohols (R—OH); non-polar aliphatic alcohols; tetraalkylsilanes [SiR$_4$]; non-polar waxes, non-polar aprotic solvents, and combinations thereof.

11. The method of claim 1, wherein the anti-solvent is a non-polar gas with a molecular weight greater than 16 grams/mol introduced at a pressure greater than 500 psi.

12. The method of claim 11, wherein the non-polar gas contains a silane or a hydrocarbon.

13. The method of claim 12, wherein the silane is a tetramethylsilane.

14. The method of claim 12, wherein the hydrocarbon is a methane.

15. The method of claim 1, further including reactivating the capture sorbent by separating the anti-solvent from the regenerated capture sorbent.

16. The method of claim 15, wherein separating the anti-solvent from the regenerated capture sorbent includes a process selected from: decanting, distilling, freezing, melting, heating, boiling, and combinations thereof at a temperature below 60° C.

17. The method of claim 16, wherein the anti-solvent is separated from the capture sorbent by distilling the anti-solvent from the capture sorbent at a temperature below 40° C.

18. A system for reversible capture and recovery of $H_2S$ from a gaseous volume, the system comprising:
an absorption chamber containing an anhydrous alkanolamine capture sorbent that chemically binds and removes $H_2S$ from the gaseous volume when presented therein that forms a switchable hydrosulfide salt; and
a stripping chamber operatively coupled to the absorption chamber configured to mix an anti-solvent comprising a non-polar organic compound with the switchable hydrosulfide salt, the anti-solvent having a miscibility in the capture sorbent when mixed therewith sufficient to change the polarity of the capture sorbent that releases chemically bound $H_2S$ from the switchable hydrosulfide salt and regenerates the anhydrous capture sorbent.

19. The system of claim 18, wherein the stripping chamber is configured to receive the switchable hydrosulfide salt after formation and to deliver the regenerated anhydrous organic capture sorbent following regeneration to the absorption chamber for reuse therein.

20. The system of claim 19, wherein the stripping chamber includes a mixer for mixing the anti-solvent with the switchable hydrosulfide salt when introduced thereto.

21. The system of claim 18, further includes a separation stage selected from the group consisting of: decanting unit, freezing unit, melting unit, distillation unit, centrifuge unit, condensing unit, cooling unit, heat exchange unit, cross-exchanger unit, reboiler unit, and combinations thereof configured to separate the anti-solvent from the regenerated capture sorbent to reactivate the anhydrous capture sorbent for re-use.

22. The system of claim 21, wherein the separation system is a continuous system for continuous processing.

23. A process for capture and release of $H_2S$, comprising:
capturing $H_2S$ with an anhydrous capture sorbent to form a switchable ionic liquid;
regenerating the anhydrous capture sorbent by contacting the switchable ionic liquid with an anti-solvent comprising a non-polar organic compound; and
reactivating the anhydrous capture sorbent for reuse by distilling the anti-solvent from the anhydrous capture sorbent or by distilling the anhydrous capture sorbent from the anti-solvent based on their volatility differences.

24. A process for capture and release of $H_2S$, comprising:
capturing $H_2S$ with an anhydrous capture sorbent to form a switchable ionic liquid;
regenerating the anhydrous capture sorbent by contacting the switchable ionic liquid with an anti-solvent comprising a non-polar organic compound; and
reactivating the anhydrous capture sorbent by cooling the anti-solvent to a temperature below the freezing point of the anti-solvent to freeze the anti-solvent and separating the anti-solvent from the anhydrous capture sorbent.

25. A process for capture and release of $H_2S$ comprising:
capturing $H_2S$ with an anhydrous capture sorbent to form a switchable ionic liquid;
regenerating the anhydrous capture sorbent by contacting the switchable ionic liquid with an anti-solvent comprising a non-polar organic compound; and
reactivating the anhydrous capture sorbent by cooling the anhydrous capture sorbent containing the anti-solvent to a temperature below the miscibility temperature of the anti-solvent to phase separate the anti-solvent from the anhydrous capture sorbent into at least two layers and decanting the anti-solvent from the anhydrous capture sorbent or vice versa to remove the anti-solvent from the anhydrous capture sorbent.

26. The process of claim 1, wherein the miscibility of the anti-solvent in the anhydrous capture sorbent is defined by a mole fraction between about 0.02 and about 0.66.

27. A process for chemically-selective removal of $H_2S$ from a gaseous volume for collection thereof, comprising:
capturing $H_2S$ present in the gaseous volume with an anhydrous alkanolamine capture sorbent to form a switchable hydrosulfide salt;
regenerating the anhydrous capture sorbent by contacting the switchable hydrosulfide salt in the capture sorbent with an anti-solvent comprising a non-polar organic compound that when mixed therewith changes the polarity of the capture sorbent releasing the chemically bound $H_2S$ from the switchable hydrosulfide salt thereby regenerating the anhydrous capture sorbent; and reactivating the anhydrous capture sorbent by cooling the anti-solvent to a temperature below the freezing point of the anti-solvent and removing the anti-solvent from the anhydrous capture sorbent.

* * * * *